United States Patent
Hollemann et al.

(10) Patent No.: US 7,463,658 B2
(45) Date of Patent: Dec. 9, 2008

(54) LASER AND METHOD FOR GENERATING PULSED LASER RADIATION

(75) Inventors: Guenter Hollemann, Jena (DE); Peter Heist, Jena (DE); Adolf Giesen, Aichtal (DE); Christian Stolzenburg, Calw-Stammheim (DE)

(73) Assignee: JENOPTIK Laser, Optik, Systeme GmbH, Jena (DE)

( * ) Notice: Subject to any disclaimer, the term of this patent is extended or adjusted under 35 U.S.C. 154(b) by 0 days.

(21) Appl. No.: 11/706,920

(22) Filed: Feb. 13, 2007

(65) Prior Publication Data
US 2008/0031290 A1 Feb. 7, 2008

(30) Foreign Application Priority Data
Feb. 13, 2006 (DE) .................. 10 2006 006 582

(51) Int. Cl.
H01S 3/10 (2006.01)
H01S 3/13 (2006.01)
(52) U.S. Cl. .................. 372/21; 372/22; 372/30
(58) Field of Classification Search .................. 372/21, 372/22, 30
See application file for complete search history.

(56) References Cited

U.S. PATENT DOCUMENTS

| 4,841,528 | A | 6/1989 | Sipes, Jr. et al. |
| 4,989,216 | A | 1/1991 | Chandra et al. |
| 5,193,096 | A | 3/1993 | Amano |
| 5,414,724 | A | 5/1995 | Zhou et al. |
| 5,553,088 | A | 9/1996 | Brauch et al. |
| 5,805,622 | A | 9/1998 | Brinkmann |
| 5,982,790 | A | 11/1999 | Grossman et al. |
| 5,987,042 | A | 11/1999 | Staver et al. |

(Continued)

FOREIGN PATENT DOCUMENTS

DE  27 31 112  1/1979

(Continued)

OTHER PUBLICATIONS

J.Yi, et al., "Temporal Control of Pulses from a High-Repetition-Rate Tunable Ti:Sapphire Laser by Active Q-switching," *Jpn. J. Appl. Phys.*, vol. 42, Pt. 1, No. 8, pp. 5066-5070 (Aug. 2003).

(Continued)

*Primary Examiner*—Armando Rodriguez
(74) *Attorney, Agent, or Firm*—Patterson, Thuente, Skaar & Christensen, P.A.

(57) ABSTRACT

A laser for generating pulsed laser radiation. An element is arranged in the resonator to generate laser radiation having the first wavelength by frequency conversion of the primary radiation. The resonator is switchable into a first state in which it is open to the primary radiation, and a second state in which it is closed to the primary radiation, and is open to laser radiation of the first wavelength in both states. A control unit switches the resonator from the first to the second state so that the primary radiation begins to oscillate and the pulse generation by frequency conversion begins, switches the resonator from the second to the first state, whereby primary radiation is coupled out from the resonator. It is possible to set the duration between both steps and/or the coupling-out behavior of the resonator to adjust the pulse duration via the control unit.

19 Claims, 2 Drawing Sheets

U.S. PATENT DOCUMENTS

| | | | |
|---|---|---|---|
| 6,028,870 | A | 2/2000 | Deutsch et al. |
| 6,172,325 | B1 | 1/2001 | Baird et al. |
| 6,529,540 | B1 | 3/2003 | Demmer et al. |
| 6,580,732 | B1 | 6/2003 | Guch, Jr. et al. |
| 6,654,391 | B2 | 11/2003 | Adams |
| 6,714,961 | B1 | 3/2004 | Holmberg et al. |
| 2002/0141457 | A1 | 10/2002 | Adams |
| 2004/0101001 | A1 | 5/2004 | Bergmann et al. |
| 2004/0228376 | A1 | 11/2004 | Dane et al. |
| 2005/0036532 | A1 | 2/2005 | McDonagh |
| 2005/0111496 | A1 | 5/2005 | Reeder et al. |
| 2006/0043079 | A1 | 3/2006 | Dane et al. |

FOREIGN PATENT DOCUMENTS

| | | |
|---|---|---|
| EP | 0 109 254 A2 | 5/1984 |
| EP | 1 447 891 A1 | 8/2004 |
| JP | 0 2144357 A | 6/1990 |
| JP | 0 5206560 A | 8/1993 |

OTHER PUBLICATIONS

W. Xie, et al., "Fluorescence feedback control of a diode pumped solid state laser," *Optics Communications*, vol. 170, pp. 265-268 (1999).

T. Tomie, et al., "Actively Mode-Locked and Q-Switched YAG Laser with Precise Synchronizability," *Jpn. J. Appl. Phys.*, vol. 22, No. 7, pp. L441-L443, (Jul. 1983).

C. Goldey, et al., "An investigation of a ruby laser repetitively pulsed at rates up to 500 kHz containing etalons and amplification," *SPIE*, vol. 3265, pp. 144-154 (1998).

K. Stock, et al., "Electrooptic Control of Solid State Laser Radiation by PLZT Ceramics Modulators," *Journal of the Korean Physical Society*, vol. 32, pp. S1769-S1770 (Feb. 1998).

J. Badziak, et al., "Giant Pulse Generation in a Laser With a Two-Photon Absorbent," *J. Tech. Phys.*, vol. 21, No. 2, pp. 191-207 (1980).

J. Sulc, et al., "$LiNbO_3$ Pockels cell for Q-switch of Er:YAG laser," *Proc. of SPIE*, vol. 5332, pp. 283-292 (2004).

Z. Liu, et al., "Long-term stable, high-pulse-energy fourth harmonic generation of Nd:YAG laser with large $Li_2B_4O_7$ crystals," *Lasers and Electro-Optics, CLEO/Pacific Rim, The $4^{th}$ Pacific Rim Conference*, vol. 2, pp. II-396-II-397 (2001).

D. Noddin, et al., "Solid State UV-Laser Technology for the Manufacture of High Performance Organic Modules," *1998 Electronic Components and Technology Conference*, pp. 822-826 (1998).

E. Raevsky, et al., "Stabilizing the output of a Pockels cell Q-switched Nd:YAG laser," *SPIE*, vol. 3613, pp. 190-196 (Jan. 1999).

P. Oesterlin, et al., "Laser annealing of doped semiconductors for ultra-shallow junctions: Systems for thermal processes in the ms range," *CLEO 2005 Phast Conference, Lasers Manufacturing, Presentation No. PWE2, Optical Society Of America* (2005).

S. Erhard, et al., "Novel Pump Design of Yb:YAG Thin Disc Laser for Operation at Room Temperature with Improved Efficiency," *Advanced Solid-State Lasers, Optical Society of America*, pp. 38-44 (1999).

W. Koechner, et al., Springer Berlin, 1999 (pp. 583-620).

E. Raevsky, et al., "Stabilizing the output of a Pockels cell Q-switched Nd:YAG laser," *Opt. Eng.*, vol. 38, No. 11, pp. 1781-1784 (1999).

W. Xie, et al., "Fluorescence feedback control of a diode pumped solid state laser," *Optics Communications*, No. 170, pp. 265-268 (1999).

M. Linne, et al., "Q-switching of diode-pumped solid-state lasers," *SPIE*, vol. 989, Miniature Optics and Lasers, pp. 110-114 (1988).

LASER AND METHOD FOR GENERATING PULSED LASER RADIATION

RELATED APPLICATION

The current application claims the benefit of priority to German Patent Application No. 10 2006 006 582.4 filed on Feb. 13, 2006. Said application is incorporated by reference herein.

FIELD OF THE INVENTION

The present invention relates to a laser for generating pulsed laser radiation of a first wavelength, wherein the laser radiation is generated by frequency conversion within the laser resonator.

BACKGROUND OF THE INVENTION

It is known to convert the infrared radiation of a laser to the visible spectral range with the help of optical, non-linear crystals preferably arranged inside the resonator. Such lasers can emit the desired pulses in a Q-switched mode.

However, Q-switched solid-state lasers have an upper limit of the pulse repetition frequency, which is determined, for instance, by the lifetime of the fluorescence of the upper laser level, the stimulated effective emission cross-section of the laser ion, the length of the resonator, the degree of coupling-out and the pumping power density. Above this limit frequency, strong fluctuations in pulse energy occur initially between two subsequent pulses ("ping pong effect"), with every other pulse respectively having the same pulse energy, but, in an alternating manner, each pulse of a higher pulse energy is followed by a pulse of a low pulse energy. In the case of still higher pulse repetition frequencies, every other pulse drops out, or there may even be several bifurcations with respect to the pulse energy. Thus, on the whole, operation above this limit frequency no longer makes sense from a technical point of view. U.S. Pat. No. 6,654,391 describes a method for a Q-switched laser with frequency doubling inside the resonator, wherein pulse stabilization is achieved in that the pulse tail of the frequency-doubled laser radiation is respectively cut off on the descending slope. What is essential here is that part of the stored energy remains in the laser, thus achieving an improvement of the pulse-by-pulse stability at high pulse repetition frequencies and an increase in frequency doubling. However, substantial pulse shortening is not possible and, therefore, this method is suitable only for Nd:YAG or Nd:YVO4 or comparable systems having a short-lived upper laser level and large effective amplification cross-sections, which lead to shorter pulses in a Q-switched laser. In order for this method to achieve high power averages for high beam quality, Nd-doped lasers are unsuitable because the high quantum defect causes considerable heating of the laser crystal and thus opto-thermal interferences to occur, limiting the power output in the case of high beam quality.

These limitations do not exist in the case of Yb:YAG lasers in the disk laser arrangement as described, for example, in EP 0 632 551. However, Yb:YAG is characterized by a very long life of the upper laser level of approx. 1 ms and by a small effective amplification cross-section. In Q-switched operation, the pulses become unstable at pulse frequencies of more than 25 kHz and the pulse lengths may be up to several µs.

U.S. Pat. No. 4,841,528 discloses a laser assembly wherein the laser is operated in the cavity dumping niode, with the coupled-out laser radiation being frequency-doubled by means of a non-linear crystal which is arranged outside the resonator. The assembly is provided such that the part of the coupled-out laser radiation which is not frequency-doubled is coupled into the resonator again. An arrangement wherein the frequency-doubled crystal is arranged within the resonator is described as disadvantageous in this reference.

SUMMARY OF THE INVENTION

In view thereof, it is an object of the invention to provide a laser for generating pulsed laser radiation of a first wavelength, in particular using a Yb:YAG laser resonator, wherein the pulse length of the frequency-converted laser radiation can be varied and the laser can be simultaneously operated at high pulse repetition frequencies, in particular higher than in the case of Q-switched lasers.

According to the invention, the object is achieved by a laser for generating pulsed laser radiation of a first wavelength, comprising a resonator, a pumped active medium arranged inside the resonator, said medium emitting primary radiation of a second wavelength which differs from the first wavelength, an element arranged in the resonator and serving to generate laser radiation having the first wavelength by frequency conversion of the primary radiation, the resonator being switchable into a first state, in which it is open to the primary radiation, and into a second state in which it is closed to the primary radiation, and being open to laser radiation of the first wavelength in both states, and the laser comprising a control unit which, in order to generate a pulse of the laser radiation, switches the resonator from the first to the second state in a first step, so that at least one resonator mode for the primary radiation begins to oscillate and the pulse generation by frequency conversion using the element begins, and which control unit, in a second step following the first step, switches the resonator from the second to the first state, whereby primary radiation is coupled out from the resonator, the intensity of the primary radiation in the resonator drops and the pulse generation thus ends, it being possible to set the duration between both steps and/or the coupling-out behavior of the resonator so as to adjust the pulse duration via the control unit.

With this laser, the approach of the cavity dumping operation is utilized to reduce the intensity of the primary radiation very quickly (abruptly, as it were) such that frequency conversion breaks down or the intensity of the frequency-converted laser radiation drops below a desired minimum value, respectively, thereby defining the pulse duration. Since the time between both steps and/or the coupling-out behavior (e.g. the degree of coupling-out in the first state of the resonator, the switching time from the second to the first state in the second step) can be set via the control unit, the pulse duration of the pulses can be easily varied within a wide range. Using a Yb-doped medium as the active medium, pulse lengths of, for example, greater than 100 ns are possible at pulse repetition frequencies of from 20 to 200 kHz.

The coupling-out behavior can be modified by setting the switching time from the second to the first state (in the second step) by means of the control unit. Since the reduction in intensity of the primary radiation in the resonator (i.e. the coupling-out of the primary radiation) slows down as the switching time increases, the pulse width is increased. Thus, the pulse width can also be set and adjusted via the switching time.

In particular, the control unit can perform the second step already during the ascending slope of the pulse. It has been shown that this enables extremely exact setting of the pulse width with very good repeatability.

The control unit may perform the second step only upon reaching a predetermined value of a predetermined physical parameter (e. g. intensity, (instantaneous) power, energy) of the primary radiation or of the laser radiation. This leads to the further advantage that the pulse energy is limited and that damage to optical components can thereby be reliably prevented. For this purpose, the laser preferably comprises a measuring module, which measures the parameter of the primary radiation or of the laser radiation directly or indirectly and transmits a corresponding signal value to the control unit. The signal value then serves to determine the present value of the parameter.

The predetermined value of the parameter (e. g. intensity, power, energy) can be set at the control unit.

In the laser, the control unit can repeatedly perform the first and second steps; it is possible to set the time between a second step and the subsequent first step for adjustment of the pulse repetition frequency at the control unit. This makes it possible to set the pulse repetition frequency and the pulse width independently of each other. In particular, individual pulses can be generated as well. By controlling the pulse width via the intensity, power or energy of the primary radiation or laser radiation, excessive pulse energies of the first pulse can be avoided, for example, during burst mode operation (pulse trains). By stabilizing the pulse energy, pulse-by-pulse stabilities of less than 5% (minimum value to maximum value) are achieved.

The resonator of the laser may comprise a coupling-out module, which couples out more primary radiation from the resonator in the first state than in the second state. In particular, the coupling-out module may be provided such that it couples out rio primary radiation in the second state.

The coupling-out module may contain at least one acousto-optical or electro-optical modulator.

The element for frequency conversion comprises, in particular, a suitable non-linear optical material and is preferably provided as an element for frequency multiplication. Thus, for example, it may cause frequency doubling. For this purpose, a lithium triborate crystal may be used, for example.

Further, a method is provided for generating pulsed laser radiation of a first wavelength, wherein, in order to generate a pulse of the laser radiation, primary radiation of a second wavelength differing from the first wavelength is generated in a resonator in a first step such that at least one resonator mode begins to oscillate and laser radiation having the first wavelength is generated from the primary radiation in the resonator by frequency conversion and is coupled out from the resonator, and in a second step following the first step, primary radiation is coupled out from the resonator such that the intensity of the primary radiation for frequency multiplication decreases and the pulse generation thus ends, wherein the time between both steps and/or the coupling-out behavior (e. g. degree of coupling out in the second step, switching time from the first to the second step) can be set so as to adjust the pulse duration.

With this method, particularly when using a Yb-doped laser medium, for example, the pulse widths can be set over a very high range. Further, pulse repetition frequencies of greater than 20 kHz are possible, and the pulse width can be set almost independently of the pulse repetition frequency.

In particular, the second step can be effected even during the ascending slope of the pulse. This allows the pulse duration to be set in an extremely exact and very reproducible manner.

Further, the second step can be effected upon reaching a predetermined value of a predetermined physical parameter (e. g. intensity, power, energy) of the primary radiation or of the laser radiation. This procedure enables very exact setting of the pulse duration. In particular, excessively high pulse energies that might cause damage to optical elements can be avoided.

In the method, the first and second step can be carried out repeatedly, it being possible to set the time between a second step and the subsequent first step so as to adjust the pulse repetition frequency. This makes it possible to select the pulse repetition frequency independently of the set pulse duration.

The method allows the pulse width to be set and adjusted via the switching time from the first to the second step because the switching time influences the coupling-out of the primary radiation. As the switching time increases, the coupling-out is slowed down, which leads to greater pulse widths.

BRIEF DESCRIPTION OF THE DRAWINGS

The invention will be explained hereinafter, by way of example and with reference to the Figures wherein.

DETAILED DESCRIPTION

Figure 1:
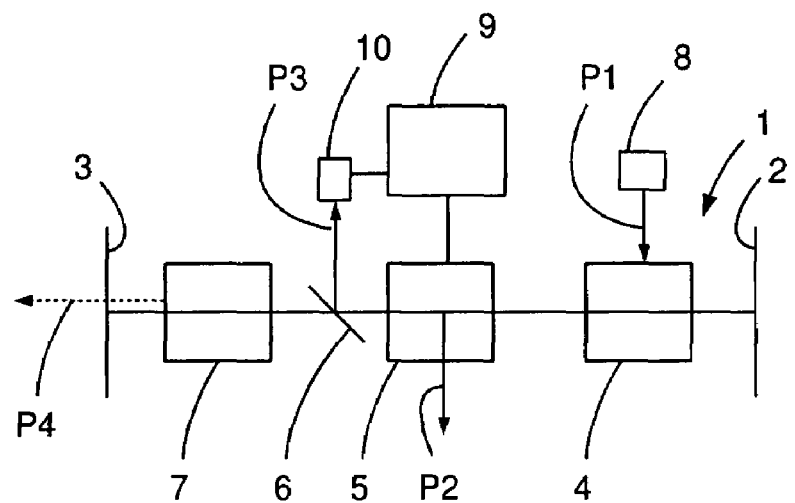
FIG. 1 is a schematic representation of the laser according to the invention in a first embodiment.

In the embodiment schematically shown in FIG. 1, the laser according to the invention for generating pulsed laser radiation of a first wavelength comprises a laser resonator 1, which is formed by two resonator mirrors 2, 3 and in which there are arranged a Yb:YAG medium 4 as the active medium, an optical coupling-out module 5, a coupling-out mirror 6 as well as a non-linear optical element 7 for frequency multiplication. The laser further comprises a pumping light source 8, a control unit 9 for controlling the coupling-out module 5, as well as a photodiode 10.

The active medium 4 is pumped with light from the pumping light source 8 (continuously, in this case) (arrow P1) and emits primary radiation of a second wavelength (in the infrared range, in this case), which differs from the first wavelength (in the visible green range, in this case). The coupling-out module 5 can be switched to first and second states by means of the control unit 9, with the generated primary radiation being coupled out from the resonator 1 in the first state (arrow P2). In this case, the resonator 1 is open to the primary radiation. In the second state of the coupling-out module 5, no primary radiation is coupled out from the resonator 1, so that the resonator 1 is closed to the primary radiation. The resonator 1 is designed here as a laser resonator for the primary radiation.

The coupling-out mirror 6 couples out a small portion of the primary radiation (arrow P3) and directs it to the photodiode 10 by which the intensity of the primary radiation in the laser resonator 1 can be measured.

In this case, the non-linear optical element 7 serves to double the frequency of the primary radiation so that the frequency-doubled green laser radiation (laser radiation of the first wavelength) is generated as the square of the intensity of the infrared primary radiation. The resonator mirror 3 is provided as a dichroic mirror, which reflects the primary radiation and transmits the frequency-doubled green laser radiation, as indicated by the arrow P4 shown in broken lines.

Figure 2:
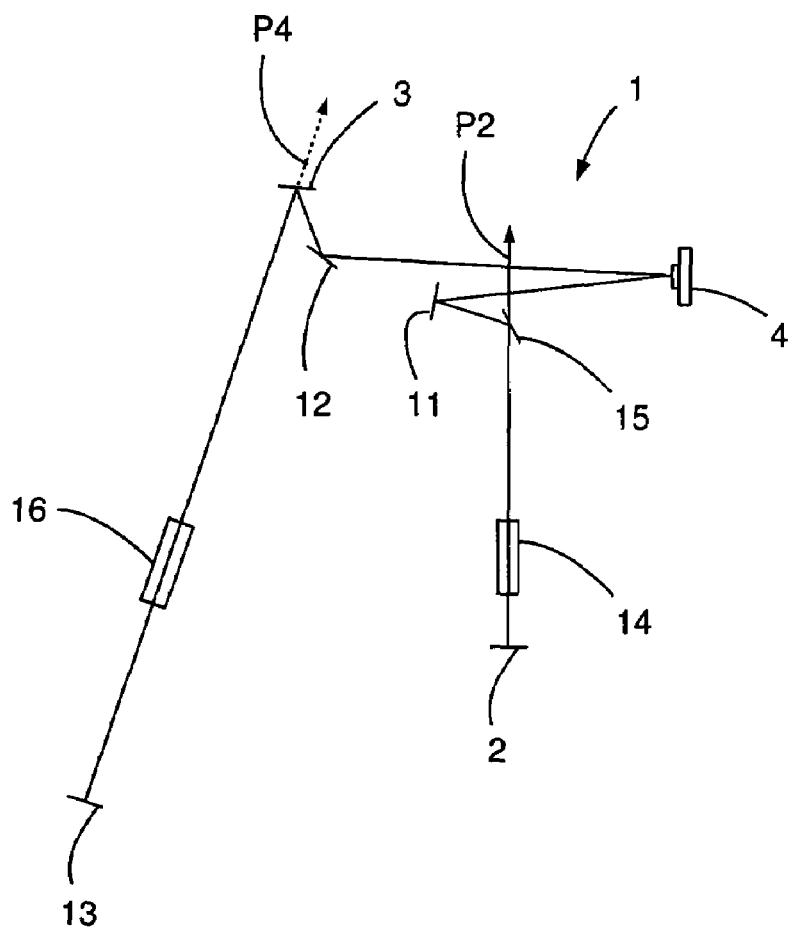
FIG. 2 is a detailed representation of the laser resonator 1 of FIG. 1.

FIG. 2 shows a specific embodiment of the laser resonator 1, not showing the coupling-out mirror 6, the pumping light source 8, the control unit 9 and the photodiode 10.

In addition to resonator mirrors 2 and 3, the laser resonator 1 comprises further mirrors 11, 12 and 13, and the active medium 4 is provided in the so-called disk laser assembly.

The coupling-out module 5 comprises a BBO Pockel's cell (BBO=beta barium borate crystal) 14 as well as a thin-film polarizer 15. The non-linear element 7 is an LBO crystal 16 (LBO=lithium triborate).

Figure 3:
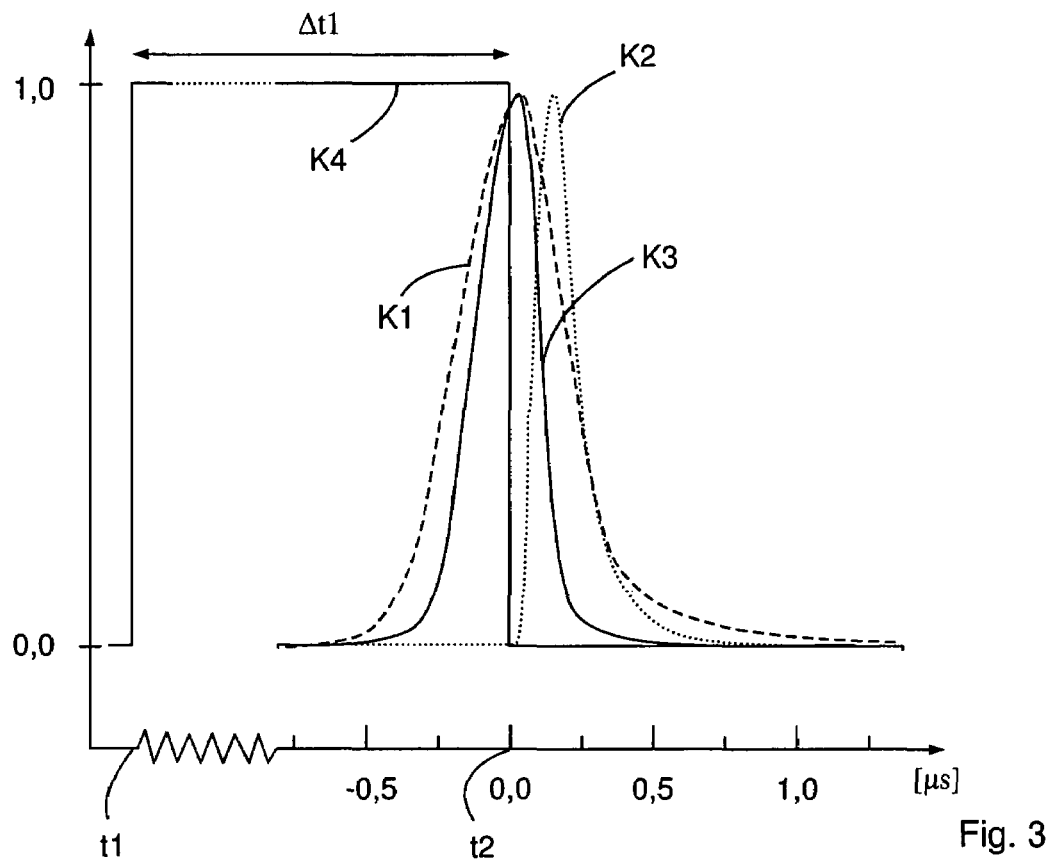
FIG. 3 depicts the pulse shape of the infrared beam generated in the resonator, of the coupled-out infrared beam and of the frequency-doubled green beam.

Operation of the laser of FIGS. 1 and 2 will be explained in combination with FIG. 3, in which the temporal pulse shape of the infrared beam inside the resonator (curve K1 shown in broken lines), of the coupled-out infrared beam (dotted curve K2) as well as of the frequency-doubled green beam (curve K3) are shown, respectively standardized to one. Further, the trigger signal is indicated with a rectangular profile (curve K4) for the Pockel's cell 14. If the trigger signal has a value of 1, the Pockel's cell 14 is deactivated, so that no generated primary radiation is coupled out from the laser resonator 1. If the trigger signal has a value of 0, the Pockel's cell 14 is activated, so that primary radiation is coupled out (arrow P2 in FIGS. 1 and 2).

Now, if the trigger signal is switched from 0 to 1 at the time t1 (FIG. 3), the laser resonator is switched from its open state (first state, in which primary radiation is coupled out) to the second state, in which no primary radiation is coupled out. Since the active medium 4 is being pumped continuously, at least one resonator mode begins to oscillate after a certain amount of time, so that the intensity (curve K1) of the infrared signal inside the resonator (primary radiation) increases. The non-linear optical element 7 (of the LBO crystal 16) uses the primary radiation to generate frequency-doubled green laser radiation (curve K3), whose intensity increases as the intensity of the infrared radiation inside the resonator increases. This increasing intensity forms the ascending slope of the desired green laser pulse.

At a time t2, the control unit 9 activates the Pockel's cell 14 (the trigger signal (curve K4) being switched from 1 to 0), so that the generated primary radiation is then coupled out. Due to transit times of the electrical signals, the Pockel's cell 14 responds with a delay of 50 ns in the example described here. This delay is indicated in the graphic representation of FIG. 3. The primary radiation generated in the resonator 1 (curve K1) decreases, and as a consequence the frequency-doubled laser radiation (curve K3) generated by means of the non-linear element 7 also decreases. The intensity of the green laser radiation drops to zero so that the descending slope is formed and the pulse is thus terminated. In contrast thereto, the coupled-out infrared radiation (K2) increases.

The pulse duration of the frequency-doubled green pulse (curve K3) can thus be set by the activation period of the Pockel's cell. The activation period corresponds to the period $\Delta t1$, during which the trigger signal is 1. The control unit 9 can modify the period $\Delta t1$ and can thus set the pulse duration or pulse width, respectively, of the generated green laser pulse (curve K3) over said period. Since the period $\Delta t1$ is approximately 10 times greater here than the pulse duration, said period is not shown to scale in FIG. 3.

The described mode of operation of the laser is similar to the so-called cavity dumping mode of operation. In the cavity dumping mode of operation, the energy in the photon field is stored in the laser resonator, and in order to generate a pulse, the desired pulse is suitably coupled out by means of an electro-optic or acousto-optic coupling-out element. In the embodiment described here, the coupling-out of the primary beam is used to terminate generation of the frequency-doubled laser beam or to allow the intensity of the frequency-doubled laser beam to drop below a desired minimum value, whereby the pulse duration of the generated frequency-doubled laser pulse can be advantageously set within wide ranges.

It has been shown that the pulse width of ca. 100 to 500 ns (for an activation period $\Delta t1$ of the Pockel's cell of 2.00 to 3.50 µs) at a pulse repetition frequency in excess of 20 kHz, in particular at pulse repetition frequencies of 50 to 200 kHz, was achieved with a diffraction index $M^2$ of less than 5 (in particular 1). A pulse duration of 300 ns and a pulse repetition frequency of 50 and 100 kHz as well as a pumping power of 450 Watts allow to achieve an average power of the green laser pulse of approximately 100 Watts. This corresponds to an efficiency in excess of 20%. As the pumping power decreased down to 150 Watts, the average power of the green pulse decreased nearly linearly to approximately 10 Watts. The pulse width could be from less than 100 ns up to even more than 1,000 ns.

The setting of the pulse duration by means of the control unit 9 is carried out in the embodiment example described here by continuously detecting the intensity of the primary radiation via the dichroic coupling-out mirror 6 and the photodiode 10. If the measured intensity exceeds a predetermined threshold value, the Pockel's cell 14 is activated.

However, it is also possible to arrange the coupling-out mirror 6 inside or outside the resonator 1 such that the intensity of the generated green laser radiation can be measured. In this case, the control can be effected as a function of the intensity of the green laser radiation in the same manner as with respect to the intensity of the primary radiation.

Further, it is possible to set the period $\Delta t1$ to predetermined constant values and to thereby determine the pulse duration of the green laser radiation.

Figure 4:
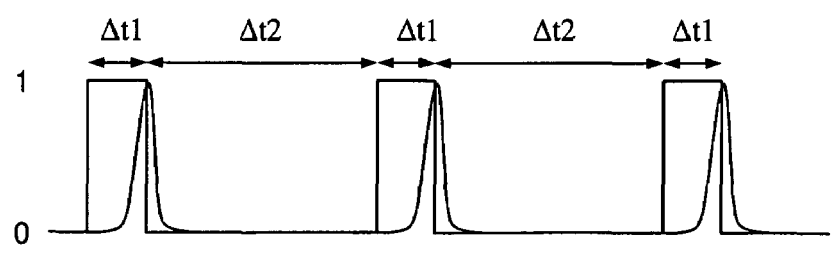
FIG. 4 depicts the time course of three generated green, frequency-multiplied laser pulses together with the trigger signal for the Pockel's cell 14 of FIG. 2.
Figure 5:
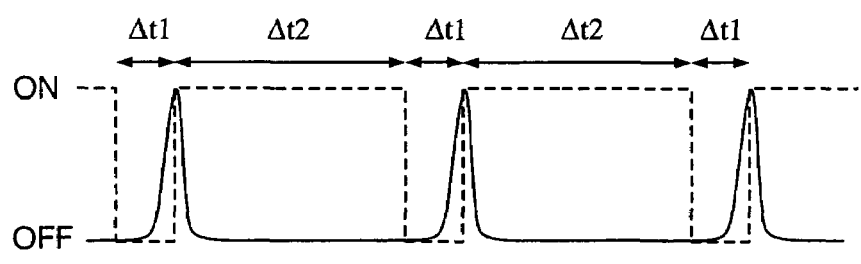
FIG. 5 depicts the time course of three generated green, frequency-multiplied laser pulses together with the on/off state of the Pockel's cell 14 of FIG. 2.

The pulse repetition frequency can be set by means of the control unit 9 by appropriately selecting the activation period of the Pockel's cell 14. FIGS. 4 and 5 respectively show only the generated green laser radiation for three subsequent pulses, with FIG. 4 showing the value of the trigger signal and FIG. 5 respectively showing the activated or the deactivated state of the Pockel's cell 14. As is evident from FIGS. 4 and 5, the pulse repetition frequency can be defined by the activation period $\Delta t2$ of the Pockel's cell 14 (i. e., the period in which the primary radiation is being coupled out). If the activation period $\Delta t2$ is increased, the pulse repetition frequency decreases. If the activation period is shortened, the pulse repetition frequency increases. Therefore, it is possible with the laser according to the invention not only to set the pulse duration via the control unit 9, but the pulse repetition frequency can also be set or adjusted, respectively; the pulse duration and the pulse repetition frequency can be set nearly independently of each other.

The Pockel's cell 14 and the polarizer 15 are designed such, in this case, that when the Pockel's cell 14 is activated, the polarizer 15 has a reflectivity of approximately 50%. When the Pockel's cell is deactivated, the polarizer has a reflectivity of (nearly) 100% (respectively related to the infrared primary radiation coming from the mirror 2 and impinging on the polarizer 15). However, the voltage to be applied to the Pockel's cell 14 in order to activate the Pockel's cell 14 allows to vary the polarization condition of the primary radiation and, thus, in connection with the polarizer, the degree of reflection at the polarizer 15 or its reflectivity, respectively, when the Pockel's cell 14 is activated. The degree of reflection when the Pockel's cell 14 is activated determines how quickly the resonator 1 is depleted. Increasing the degree of reflection when the Pockel's cell 14 is activated causes less primary radiation to be coupled out per time unit, so that the pulse width of the green pulse increases for the same activation period of the Pockel's cell 14. When the reflectivity decreases by the correspondingly applied voltage when the Pockel's cell 14 is activated, the pulse duration decreases.

Thus, while increasing the voltage applied to the Pockel's cell 14 from 2.0 kV to 3.5 kV, the pulse duration could be decreased from approximately 400 ns to approximately 200 ns.

In the described embodiments, the activation time of the Pockel's cell 14 is always selected such that it is on the still ascending slope of the frequency-doubled green laser radiation.

It is also possible to trigger the Pockel's cell 14 by the fluorescent light of the active medium 4, because said light increases as the inversion increases.

The invention claimed is:

1. A laser for generating pulsed laser radiation of a first wavelength, comprising
    a resonator;
    a pumped active medium arranged inside the resonator, said medium emitting primary radiation of a second wavelength which differs from the first wavelength;
    an element arranged in the resonator that generates laser radiation having the first wavelength by frequency conversion of the primary radiation;
    the resonator being switchable into a first state in which it is open to the primary radiation, and into a second state in which it is closed to the primary radiation, and being open to laser radiation of the first wavelength in both states; and
    a control unit which, in order to generate a pulse of the laser radiation, includes:
    means for switching the resonator from the first state to the second state, so that at least one resonator mode for the primary radiation begins to oscillate and the pulse generation by frequency conversion using the clement begins;
    means for switching the resonator from the second to the first state, whereby primary radiation is coupled out from the resonator, and thus the pulse generation ends; and
    means for adjusting the pulse duration which allows setting at least one of the duration between the first state and the second state and the coupling-out behavior of the resonator.

2. The laser as claimed in claim 1, wherein the active medium is a Yb-doped medium.

3. The laser as claimed in claim 1, wherein the means for switching the resonator from the second to the first state operates during an ascending slope of the pulse.

4. The laser as claimed in claim 1, wherein the means for switching the resonator from the second to the first state operates only upon reaching a predetermined value of a physical parameter of the primary radiation or of the laser radiation.

5. The laser as claimed in claim 4, wherein the predetermined value can be set at the control unit.

6. The laser as claimed in claim 1, wherein, in order to set the coupling-out behavior, the degree of coupling-out of the resonator in the first state can be set.

7. The laser as claimed in claim 1, wherein in order to set the coupling-out behavior, the switching time from the second to the first state can be set.

8. The laser as claimed in claim 1, wherein the control unit repeatedly switches the resonator from the first state to the second state and is adjustable to set a time between an end of a first cycle and a beginning of a subsequent second cycle to adjust a pulse repetition frequency.

9. The laser as claimed in claim 1, wherein the resonator comprises a coupling-out module which couples out more primary radiation from the resonator in the first state than in the second state.

10. The laser as claimed in claim 9, wherein the coupling-out module includes an acousto-optic or electro-optic modulator.

11. The laser as claimed in claim 1, wherein the control unit repeatedly switches the resonator from the first state to the second state in order to generate multiple pulses such that at least one of the pulse duration of each generated pulse is from about 200 to about 400 ns or a pulse repetition frequency of the multiple pulses greater than about 20 kHz is achieved.

12. A method of generating pulsed laser radiation of a first wavelength in order to generate a pulse of said laser radiation, comprising
    providing a resonator and a pumped active medium arranged inside the resonator, said medium emitting primary radiation of a second wavelength which differs from the first wavelength;
    wherein the resonator being switchable into a first state in which it is open to the primary radiation, and into a second state in which it is closed to the primary radiation, and being open to laser radiation of the first wavelength in both states; and said method further comprising
    a first step of switching the resonator from the first state to the second state, so that at least one resonator mode for the primary radiation begins to oscillate and the pulse generation by frequency conversion in the resonator begins,
    a second step of switching the resonator from the second state to the first state, whereby primary radiation is coupled out from the resonator, and thus the pulse generation ends; and
    adjusting the pulse duration by setting at least one of the duration between the first state and the second state and the coupling-out behavior of the resonator.

13. The method as claimed in claim 12, further comprising switching the resonator from the second state to the first state during an ascending slope of the pulse.

14. The method as claimed in claim 12, further comprising switching the resonator from the second state to the first state only upon reaching a predetermined value of a physical parameter of the primary radiation or of the laser radiation.

15. The method as claimed in claim 14, further comprising setting the predetermined value.

16. The method as claimed in claim 12, further comprising setting a degree of coupling-out of the resonator in the first state in order to set the coupling-out behavior.

17. The method as claimed in claim 12, further comprising setting a switching time from the second state to the first state in order to set the coupling-out behavior.

18. The method as claimed in claim 12, further comprising repeatedly switching the resonator from the first state to the second state and adjusting to set a time between a first cycle and a subsequent second cycle to adjust a pulse repetition frequency.

19. The method as claimed in claim 12, further comprising repeatedly switching the resonator from the first state to the second state in order to generate muttiple pulses such that at least one of the pulse duration of each generated pulse is adjusted to about 200 to about 400 ns or the pulse repetition frequency of the multiple pulses is adjusted to be greater than about 20 kHz.

* * * * *